United States Patent
Zimmermann et al.

(10) Patent No.: US 9,326,351 B2
(45) Date of Patent: Apr. 26, 2016

(54) LED CONTROLLER COMPRISING A CLOCKED CURRENT SOURCE

(75) Inventors: Michael Zimmermann, Heiligkreuz (CH); Eduardo Pereira, Siebnen (CH)

(73) Assignee: Tridonic AG, Ennenda (CH)

( * ) Notice: Subject to any disclaimer, the term of this patent is extended or adjusted under 35 U.S.C. 154(b) by 801 days.

(21) Appl. No.: 13/635,555

(22) PCT Filed: Mar. 21, 2011

(86) PCT No.: PCT/EP2011/054218
§ 371 (c)(1),
(2), (4) Date: Nov. 27, 2012

(87) PCT Pub. No.: WO2011/113955
PCT Pub. Date: Sep. 22, 2011

(65) Prior Publication Data
US 2013/0134893 A1 May 30, 2013

(30) Foreign Application Priority Data

Mar. 19, 2010 (DE) .......................... 10 2010 003 067
Jul. 12, 2010 (DE) .......................... 10 2010 031 239

(51) Int. Cl.
*G05F 1/00* (2006.01)
*H05B 37/02* (2006.01)
*H05B 33/08* (2006.01)

(52) U.S. Cl.
CPC ............ *H05B 37/02* (2013.01); *H05B 33/0815* (2013.01); *Y02B 20/347* (2013.01)

(58) Field of Classification Search
USPC .......... 315/209 R, 177, 186, 193, 200 R, 224, 315/247, 246, 276, 287, 291, 297, 307, 308, 315/311, 360, 362
See application file for complete search history.

(56) References Cited

U.S. PATENT DOCUMENTS

| 2004/0041620 | A1 | 3/2004 | D'Angelo et al. |
| 2009/0230891 | A1 | 9/2009 | Zhao et al. |
| 2010/0026208 | A1 | 2/2010 | Shteynberg et al. |

OTHER PUBLICATIONS

English translation of the International Preliminary Report on Patentability issued in connection with the corresponding International Application No. PCT/EP2011/054218 on Oct. 4, 2012.
International Search Report issued in connection with the corresponding International Application No. PCT/EP2011/054218 on Aug. 22, 2011.

*Primary Examiner* — Douglas W Owens
*Assistant Examiner* — Jianzi Chen
(74) *Attorney, Agent, or Firm* — The H.T. Than Law Group

(57) ABSTRACT

The invention relates to an LED driver circuit comprising: a circuit block for providing an adjustable DC voltage and a clocked constant current source, e.g. a DC/DC converter that is supplied with the DC voltage, comprising a switch that is clocked by a control circuit in such a way that a reduction of the activation period ton of the switch leads to a reduction in the provision of power. One or more LEDs can be supplied from the constant current source and in addition to reducing the activation period tON, the control unit is designed to change at least one other control variable of the constant current source or the circuit block in order to provide the direct current.

22 Claims, 3 Drawing Sheets ial power
LED CONTROLLER COMPRISING A CLOCKED CURRENT SOURCE

BACKGROUND OF THE INVENTION

The present invention relates quite generally to the operation of LEDs, with this being understood to mean inorganic LEDs and organic LEDs (OLEDs).

In principle, it is already known to supply electrical power to an LED section which can have one or more LEDs connected in series, from a constant current source. It is likewise known to use PWM modulation to implement dimming, with the result that the mentioned constant current regulation is implemented in the switch-on time periods of a PWM pulse train. During dimming, therefore, the duty factor of the PWM signal is then varied.

In order to provide the supply voltage of the constant current source, an actively clocked PFC (Power Factor Correction) circuit can be used, for example.

Finally, further demands also need to be taken into consideration during operation of LEDs, for example the fact that, generally, DC isolation between the LED section and the supply voltage of the PFC, typically an AC system voltage, is required.

SUMMARY OF THE INVENTION

This object is achieved by the features of the independent claims. The dependent claims develop the central concept of the invention in a particularly advantageous manner.

A first aspect of the invention relates to an LED operating circuit, having:
 a circuit block for providing an adjustable DC voltage, and
 a clocked constant current source, for example a DC-to-DC converter supplied with the DC voltage, with a switch, which is clocked by a control circuit in such a way that a reduction in the switch-on time period $t_{on}$ of the switch results in a reduction in the power provision, wherein, starting from the constant current source, one or more LEDs can be supplied,
wherein the control unit is designed to vary at least one further control variable of the constant current source or of the circuit block for DC provision, in addition to the reduction in the switch-on time period $t_{on}$.

The control unit can be designed to vary the further control variable of the constant current source or adjustable DC voltage only in specific load states or operating states.

The control unit can be designed to reduce the switch-on time period $t_{on}$ of the switch down to a minimum value $t_{on\_min}$ in order to reduce the power provision in order then to reduce the power provision by changing the further control variable whilst maintaining the minimum switch-on time period $t_{on\_min}$ or increasing the switch-on time period.

The circuit block for providing a DC voltage can be an actively clocked PFC circuit.

The power provision can be varied by varying the clocking of a switch in the PFC circuit.

The further control variable can be the preset of a setpoint value of the adjustable DC output voltage of the circuit block for providing a DC voltage.

It is possible for at least one feedback variable reproducing the load to be suppliable to the control unit, such as, for example:
 a dimming signal,
 the current through the at least one LED, and/or
 the voltage across the at least one LED.

The control unit can have an interface for supplying a dimming value.

The clocked constant current source can be selected from:
 buck converter,
 boost converter,
 buck-boost converter
 SEPIC converter.

The invention furthermore relates to an LED luminaire, having at least one LED and one LED operating circuit of the abovementioned type.

The invention also proposes a method for operating at least one LED, with an LED operating circuit, comprising:
 generating an adjustable DC voltage, and
 clocking a constant current source, for example a DC-to-DC converter supplied with the DC voltage, with a switch in such a way that a reduction in the switch-on time period $t_{on}$ of the switch results in a reduction in the power provision, wherein, starting from the constant current source, one or more LEDs are supplied,
wherein at least one further control variable of the constant current source or adjustable DC voltage is varied, in addition to the reduction in the switch-on time period $t_{on}$.

The switch-on time period $t_{on}$ of the switch can be reduced down to a minimum value $t_{on\_min}$ in order to reduce the power provision, in order then to reduce the power provision by varying the further control variable whilst maintaining the minimum switch-on time period $t_{on\_min}$ or increasing the switch-on time period.

The power provision can be achieved by changing the mode of operation of the circuit which generates the adjustable DC voltage. For example, an actively clocked PFC can change its operating mode.

The power provision can be varied by varying the clocking of a switch in the PFC circuit.

The further control variable can be the preset of a setpoint value of the adjustable DC output voltage of the circuit block for providing a DC voltage.

At least one feedback variable can be supplied to an open-loop/closed loop control system of the load provision, such as, for example:
 a dimming signal,
 the current through the at least one LED, and/or
 the voltage across the at least one LED.

The further control variable of the constant current source or adjustable DC voltage can only be varied in a specific load state or operating state. There are therefore preferably one or more load states or operating states in which the further control variable of the constant current source or the adjustable DC voltage is not changed.

As an alternative or in addition, provision can be made for the further control variable of the constant current source or adjustable DC voltage to be changed only when the value (extent) of the variation in the specific load state or operating state is within a predetermined range, for example exceeds a minimum threshold.

Finally, the invention also relates to a control unit, in particular an integrated circuit such as, for example, an ASIC or microcontroller, which is designed to implement such a method.

BRIEF DESCRIPTION OF THE DRAWINGS

Further features, advantages, properties and objects of the present invention will now be explained using exemplary embodiments of the present invention with reference to the figures in the attached drawings.

DETAILED DESCRIPTION OF THE INVENTION

Figure 1:
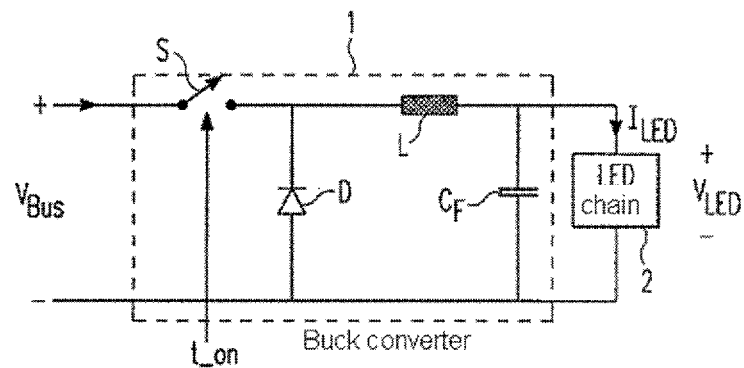
FIG. 1 shows an example of a clocked constant current source in the form of a buck converter.

FIG. 1 shows an example of a clocked constant current source, which is in the form of a buck converter 1 in this case. However, any other clocked constant current source in the form of a DC-to-DC converter can be used, such as a boost converter, a buck-boost converter, a flyback converter, a SEPIC, etc.

An adjustable DC supply voltage $V_{Bus}$ is supplied to the clocked constant current source 1. As will be explained below, this adjustable DC supply voltage $V_{Bus}$ can be generated, for example, by an actively clocked PFC (Power Factor Correction) circuit.

A control unit (not yet shown in FIG. 1) controls or regulates the switch-on time period $t_{on}$ of a switch S of the buck converter 1, which also has a diode D and a storage inductor L. The output voltage of the clocked constant current source 1 is stabilized by a storage capacitor $C_F$. The voltage across the capacitor $C_F$ is then supplied to the LED section 2, which has one or more LEDs. The current through the LED section 2 is denoted by $I_{LED}$ and the voltage across the LED section is denoted by $V_{LED}$. The LED section 2 can also optionally have a linear controller as additional constant current source, in addition to the LED itself. Precisely when the LED section 2 is in the form of a plurality of LED modules connected in series, each of these LED modules can have such a linear controller for stabilizing the LED current.

In a known manner, the power provision of the clocked constant current source 1 shown in FIG. 1 can be achieved by a reduction in the switch-on time period $t_{on}$ of the cyclically opened and closed switch S.

However, there is the problem that, in the event of an increasing reduction in the switch-on time period $t_{on}$, the electrical losses rise overproportionally with respect to the power supplied to the LEDs 2.

Figure 2:
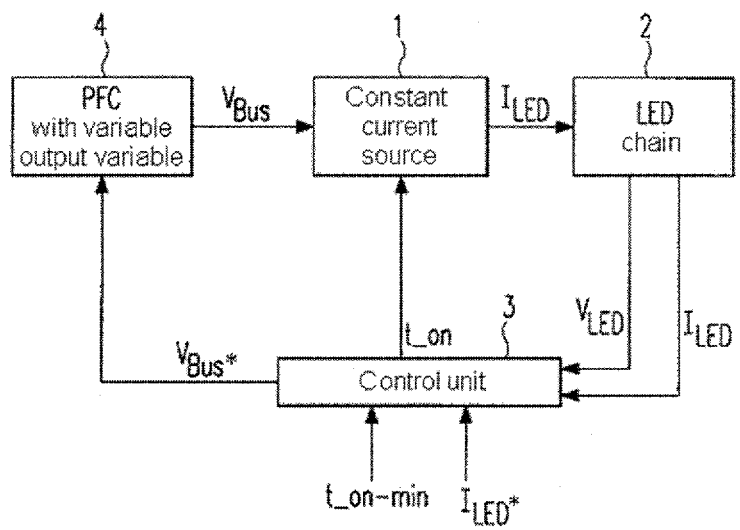
FIG. 2 shows a system according to the invention, in which a control unit firstly drives a clocked constant current source and secondly also has an influence on the generation of the DC supply voltage $V_{Bus}$ for the constant current source.

With reference to FIG. 2, an explanation will now be given in respect of the fact that a control unit 3 firstly outputs the switch-on time period $t_{on}$ of the switch S of the constant current source 1 as control variable.

However, the invention provides that, as shown in FIG. 2, the control unit 3 (or else a further control unit separate therefrom) as further control variable for the power provision of the constant current source 1, has an influence on the level of the DC supply voltage $V_{Bus}$ of the clocked constant current source 1. In the example illustrated, the control unit 3 presets the setpoint value $V_{Bus*}$, which is then used in the regulation of the actively clocked PFC 4 for driving the switch provided there (not illustrated).

It is of course possible firstly for the control unit 3 shown in FIG. 2 to have a direct influence on the clocking of the switch in the PFC circuit 4. Alternatively, the setpoint value $V_{Bus*}$ for the output voltage of the PFC 4 can also be preset to a further control unit in the PFC circuit, which then performs the clocking of the switch in the PFC 4 depending on a measurement of the actual output voltage $V_{Bus}$. The PFC circuit can be in the form of a SEPIC converter, for example. However, any other clocked switching controller in the form of a DC-to-DC converter can be used, such as a buck-boost converter, a boost converter, a buck-boost converter, a flyback converter, a Cuk converter, etc.

In addition or as an alternative, not only can the bus voltage $V_{Bus}$ be adapted as control variable of the circuit block for DC provision, but also the operating mode of the circuit block for DC provision (in particular when using an actively clocked PFC). Depending on the load state or else operating state, the circuit block for DC provision can change the operating mode either independently (i.e. the PFC 4 directly) or by a corresponding driving, in particular by the control unit 3. In particular, the PFC 4 can operate either in the so-called borderline mode between the discontinuous and the continuous conduction mode or in the continuous conduction mode during operation with a high load and, during operation with a low load or in the standby mode, can operate in the discontinuous conduction mode. However, it would also be possible, for example, for the PFC 4 to change into the so-called burst mode (i.e. a pulse-no-pulse operating mode or else pulse mode) during operation on a low load or in the standby mode. In this case, the supply voltage (bus voltage $V_{Bus}$) is still kept the same, but after a number of drive pulses for the switch (switches) in the PFC 4 a relatively long interpulse period is set before the next "burst" (pulse) as drive signal for the switch of the PFC 4 is applied. The interpulse period between the pulse trains is in this case substantially longer than, for example, at least twice an addition of the switch-on time periods of the switches in the PFC 4.

The control unit can be designed such that at least one further control variable of the constant current source or the circuit block for DC provision can be varied depending on the load state or else operating state, in addition to the reduction in the switch-on time period $t_{on}$.

Preferably, the additional change in a further control variable of the constant current source or the circuit block for DC provision only takes place in specific load states or else operating states of the LED operating circuit. For example, the additional variation in a further control variable of the constant current source or of the circuit block for DC provision can only take place in a low-load range or during faulty operation. This can therefore be the case in particular in the event of a low luminous efficacy of the LED section.

There are therefore preferably one or more load states or operating states in which the further control variable of the constant current source or the adjustable DC voltage is not changed.

As an alternative or in addition, provision can be made for the further control variable of the constant current source or adjustable DC voltage to only be changed when the value (extent) of the variation in the specific load state or operating state is within a predetermined range, for example exceeds a minimum threshold.

As can also be seen from FIG. 2, various feedback variables can be supplied to the control unit 3. In the present example, these are in particular a signal $I_{LED*}$, which presets the setpoint value for the current $I_{LED}$ through the LEDs 2. Since the luminous efficacy of the LED section 2 is substantially proportional to the current $I_{LED}$ through the LED section, this setpoint value signal $I_{LED*}$ can also be referred to as a dimming value preset. Firstly, therefore, the control unit 3 can influence the control variable "switch-on time period $t_{on}$" and "supply voltage $V_{Bus}$" depending on a dimming value preset $I_{LED*}$. This may be simple control, i.e. depending on the setpoint value preset the values to be adjusted for the switch-on time period $t_{on}$ and the supply voltage $V_{Bus}$ are selected depending on the setpoint value preset by means of an analytical function and/or a look-up table or other means.

The control unit 3 can adjust the LED current $I_{LED}$ without a direct control loop, for example owing to a dimming value preset (for example by means of a dimmer or a dimming command supplied via an interface).

As an alternative or in addition, however, measured variables can also be fed back to the control unit 3, in particular from the region of the constant current source 1 and/or the LED section 2. In the example illustrated, the feedback variables are in particular the measured LED current $I_{LED}$ (as actual value) and/or the voltage ($V_{LED}$) across the LEDs. However, it is also possible, for example, for external control signals such as dimming value presets, sensor signals (motion sensors, daylight sensors, . . . ) or color control commands to be supplied to the control unit 3.

In accordance with the invention, provision is furthermore made for the control unit 3 to be capable of having a preset for a minimum switch-on time period $t_{on\_min}$ for the switch of the clocked constant current source 1. As in the present case, in particular with reference to FIGS. 3 and 5, the control unit 3 reduces the switch-on time period $t_{on}$ of the switch of the constant current source 1 so as to reduce the power provision for the LED section 2 only down to the preset minimum value for the switch-on time period $t_{on\_min}$. When the minimum value for the switch-on time period $t_{on\_min}$ of the switch S of the constant current source 1 is reached which control unit 3 then as an alternative or in addition at least one further control variable from the range of the provision of the supply voltage $V_{Bus}$ and the clocked constant current source 1 if a reduction in the power provision, for example predetermined by a dimming value signal $I_{LED*}$, is required which can no longer be achieved by a reduction in the switch-on time period $t_{on}$ down to the minimum value $t_{on\_min}$.

In the present example, the control unit 3 reduces, directly or indirectly, the amplitude of the DC supply voltage $V_{Bus}$.

Figure 3:
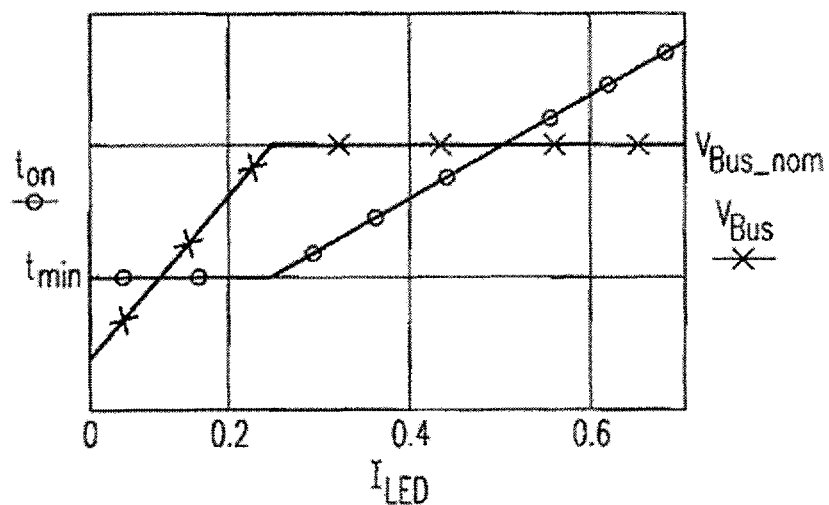
FIG. 3 shows the variation in the supply voltage $V_{Bus}$ for the constant current source and the variation in the switch-on time period of the switch of the clocked constant current source depending on the current to be achieved through the LED section $I_{LED}$.

This is shown in FIG. 3. The X axis in this figure in this case denotes the LED current $I_{LED}$ which is representative of the luminous efficacy to be achieved. Starting from the maximum LED current $I_{LED}$, as is illustrated, the switch-on time period of the switch is first reduced substantially linearly until a predetermined minimum value for the switch-on time period $t_{on\_min}$ is reached. From this point in time on, in the example illustrated, the switch-on time period is then kept constant in order to reduce the power provision, i.e. to the value $t_{on\_min}$. The further reduction in the power provision then takes place by means of a for example linear reduction in the supply voltage $V_{Bus}$ of the clocked constant current source 1.

Figure 4:
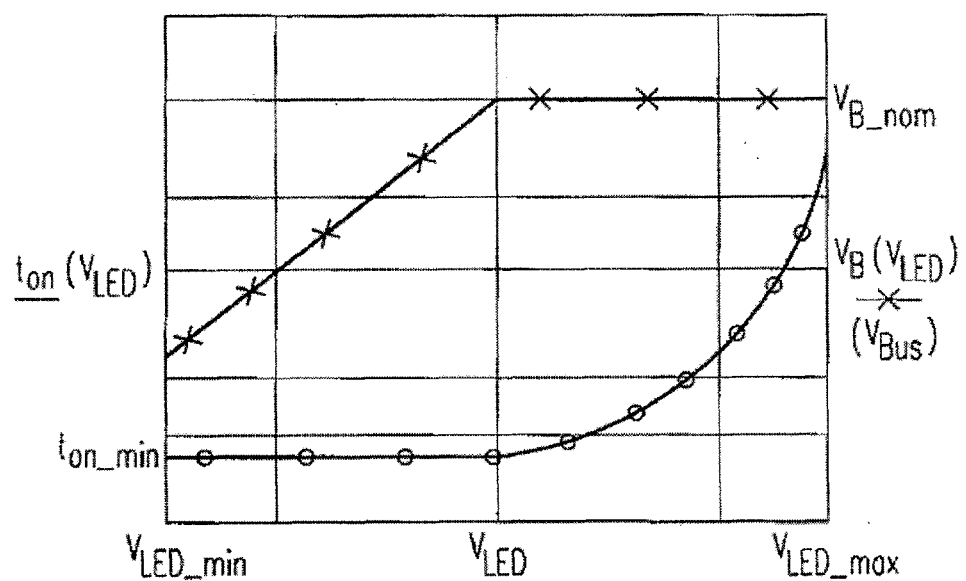
FIG. 4 shows the dependency of the switch-on time period of the switch of the clocked constant current source and the supply voltage $V_{Bus}$ as a function of the voltage across the LED section VLED.

FIG. 4 shows a comparable illustration to that shown in FIG. 3, but in this case the voltage across the LED section $V_{LED}$ is plotted as the variable for the X axis and therefore the dependency of the switch-on time period $t_{on}$ of the switch and the supply voltage $V_{Bus}$ (or $V_B$) on the voltage $V_{LED}$ (across the LED section 2) is shown.

As an alternative to the combined regulation shown in FIG. 3, however, provision can also be made for the switch-on time period to be increased again when the minimum value $t_{on\_min}$ is reached, for example down to a variance value, and this is overcompensated by a reduction in the supply voltage $V_{Bus}$ of the clocked constant current source.

The control unit 3 can also monitor the bus voltage $V_{Bus}$, in particular also the ripple of the bus voltage $V_{Bus}$ (i.e. the fluctuations within a specific time). Depending on the evaluation of the ripple of the bus voltage $V_{Bus}$, the control unit 3 can influence the driving of the clocked constant current source 1. In particular, the switch-on time period of the clocked constant current source 1 can be matched to the evaluation of the ripple of the bus voltage $V_{BUS}$ in order to reduce the ripple at the output of the clocked constant current source 1. Preferably, in this case the switch-on time period of the clocked constant current source 1 is reduced as the bus voltage $V_{Bus}$ increases and increases as the bus voltage $V_{Bus}$ decreases. In this way, it is possible to achieve the situation in which this ripple on the bus voltage $V_{Bus}$ is passed on at a lower level to the output of the clocked constant current source 1. This matching of the switch-on time period of the clocked constant current source 1 owing to the ripple of the bus voltage $V_{Bus}$ can take place in addition to the control loop for the regulation of the LED current $I_{LED}$ or can be included in this control loop as input variable or else can also be included in the adjustment of the switch-on time period as additional influence when setting the switch-on time period as a function of the desired LED current $I_{LED}$.

Figure 5:
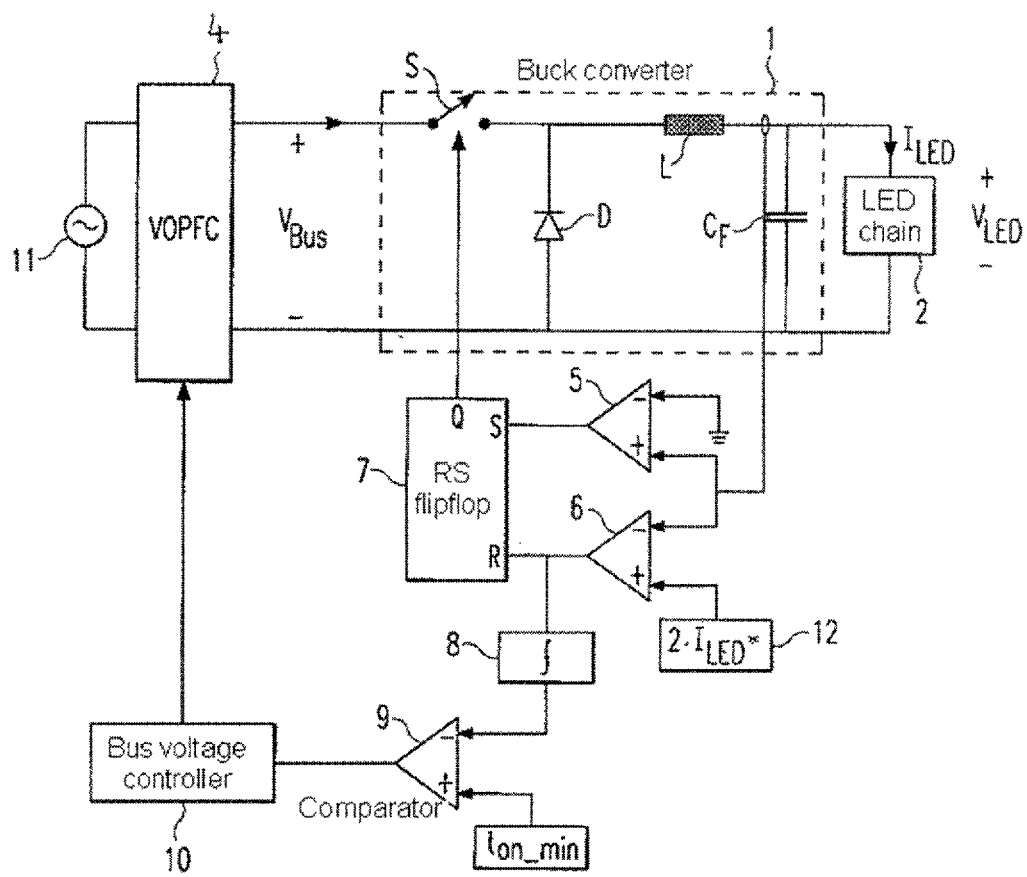
FIG. 5 shows a specific exemplary embodiment, in which the combined regulation of the power provision of a clocked constant current source has an influence on the control variable "DC supply voltage of the clocked constant current source" and "clocking of the switch of the clocked constant current source".

FIG. 5 shows a specific exemplary embodiment (implementation) for such a combined regulation. As illustrated in said figure, the current $I_{LED}$ through the LEDs is detected inductively as feedback variable and supplied to two comparators 5, 6, whose output signal is supplied to an RS flipflop 7.

One of the two comparators compares the actual value signal $I_{LED}$ at the inverted input with the setpoint value signal $I_{LED*}$. The differential signal is time-integrated 8, wherein the integration result is supplied to the inverted input of a further comparator 9. This comparator 9 compares the result of the integration 8 of the control difference with the preset minimum switch-on time period $t_{on\_min}$ for the switch S of the clocked constant current source 1.

The output signal of this further comparator 9 is supplied to a bus voltage controller 10, which directly or indirectly influences the actively clocked PFC 4 in such a way that the bus voltage is reduced depending on the output signal of the further comparator 9.

In a known manner, the PFC 4 is supplied with an AC voltage 11, which can be an AC system voltage, for example. In general, a rectifier, a filter circuit etc. is also connected between the AC voltage 11 and the PFC 4.

In the circuit shown in FIG. 5, the bus voltage controller 10 is always regulated to the maximum possible bus voltage $V_{Bus}$ as long as the integration result 8 is greater than the minimum permissible time period $t_{on\_min}$.

The RS flipflop 7 shows, merely in simplified form, the implementation of hysteresis regulation for the switch-on of the switch S of the clocked constant current source 1. The switch-on threshold for the switch (MOSFET) of the illustrated buck converter is achieved whenever the current through the LED has decreased to zero. This corresponds to the implementation of the so-called borderline mode or critical conduction mode (borderline case between the discontinuous and continuous conduction modes). However, provision can also be made for the current to first dwell at the zero level for a time before the switch is switched on again (discontinuous conduction mode). Alternatively, the switch-on threshold of the switch can also be at a current level of higher than zero, with the result that the so-called continuous conduction mode is then implemented.

In the present case, the switched-off threshold for the switch is defined by virtue of the fact that the comparator comparison value 12 is set to twice the setpoint value of the LED current $I_{LED}$, i.e. twice $I_{LED*}$.

In the case of the borderline mode, this means that the current cycle rises from zero to twice the setpoint value and then falls back to zero. And of the triangular current profile thus produced, the temporal mean of the current with the peak of twice $I_{LED*}$ is then precisely the desired setpoint value $I_{LED*}$.

In the example shown in FIG. 5, the control unit 3 comprises, inter alia, the comparators 5, 6, 9, an RS flipflop 7 and a bus voltage controller 10. This example shows that the control unit 3 also comprises a plurality of individual elements and can have an at least partially discrete design.

The invention claimed is:

1. An LED operating circuit, having:
a circuit block for providing an adjustable DC voltage, and
a clocked constant current source, supplied with the DC voltage, with a switch (S), which is clocked by a control circuit in such a way that a reduction in the switch-on time period $t_{on}$ of the switch (S) results in a reduction in the power provision, wherein, starting from the constant current source, one or more LEDs can be supplied,
wherein the control unit is designed to vary at least one further control variable of the constant current source or of the circuit block for DC provision, in addition to the reduction in the switch-on time period ($t_{on}$), and
wherein the control unit is designed to reduce the power provision of the constant current source by varying the at least one further control variable of the constant current source or of the circuit block for DC provision, in case the switch-on time period ($t_{on}$) corresponds to a preset minimum value ($t_{on\_min}$).

2. The LED operating circuit as claimed in claim 1, wherein the control unit is designed to vary the further control variable of the constant current source or adjustable DC voltage only in specific load states or operating states.

3. The LED operating circuit as claimed in claim 1, wherein the control unit is designed to reduce the switch-on time period ($t_{on}$) of the switch (S) down to a minimum value ($t_{on\_min}$) in order to reduce the power provision in order then to reduce the power provision by changing the further control variable whilst maintaining the minimum switch-on time period ($t_{on\_min}$) or increasing the switch-on time period.

4. The LED operating circuit as claimed in claim 1, in which the circuit block for providing a DC voltage is an actively clocked PFC circuit.

5. The LED operating circuit as claimed in claim 4, wherein the power provision is variable by varying the clocking of a switch in the PFC circuit.

6. The LED operating circuit as claimed in claim 1, in which the further control variable is the preset of a setpoint value of the adjustable DC output voltage of the circuit block for providing a DC voltage.

7. The LED operating circuit as claimed in claim 1, in which at least one feedback variable representing the load is supplied to the control unit.

8. The LED operating circuit as claimed in claim 7, wherein the at least one feedback variable representing the load is:
a dimming signal,
the current through the at least one LED, and/or
the voltage across the at least one LED.

9. The LED operating circuit as claimed in claim 1, in which the control unit has an interface for supplying a dimming value.

10. The LED operating circuit as claimed in claim 1, in which the clocked constant current source is selected from a group consisting of:
a buck converter,
a boost converter,
a buck-boost converter, and
a SEPIC converter, and combination thereof.

11. An LED luminaire, having at least one LED and an operating circuit as claimed in claim 1.

12. A method for operating at least one LED, with an LED operating circuit, comprising:
generating an adjustable DC voltage, and
clocking a constant current source, supplied with the DC voltage, with a switch (S) in such a way that a reduction in the switch-on time period $t_{on}$ of the switch (S) results in a reduction in the power provision, wherein, starting from the constant current source, one or more LEDs are supplied,
wherein at least one further control variable of the constant current source or adjustable DC voltage is varied, in addition to the reduction in the switch-on time period ($t_{on}$), and
wherein the control unit reduces the power provision of the constant current source by varying the at least one further control variable of the constant current source or adjustable DC voltage, in case the switch-on time period ($t_{on}$) corresponds to a present minimum value ($t_{on\_min}$).

13. The method as claimed in claim 12, wherein the switch-on time period ($t_{on}$) of the switch (S) is reduced down to a minimum value ($t_{on\_min}$) in order to reduce the power provision, in order then to reduce the power provision by varying the further control variable whilst maintaining the minimum switch-on time period ($t_{on\_min}$) or increasing the switch-on time period.

14. The method as claimed in claim 12, in which the circuit block for providing a DC voltage is an actively clocked PFC circuit.

15. The method as claimed in claim 14, wherein the power provision is varied by varying the clocking of a switch in the PFC circuit.

16. The method as claimed in claim 12, in which the further control variable is the preset of a setpoint value of the adjustable DC output voltage of the circuit block for providing a DC voltage.

17. The method as claimed in claim 12, in which at least one feedback variable is supplied to an open-loop/closed loop control system of the load provision.

18. The method as claimed in claim 17, wherein the at least one feedback variable is:
a dimming signal,
the current through the at least one LED, and/or
the voltage across the at least one LED.

19. The method as claimed in claim 12, in which the further control variable of the constant current source or adjustable DC voltage is only varied in a specific load state or operating state.

20. A control unit, which is designed to implement a method as claimed in claim 12.

21. The control unit as claimed in claim 20, wherein the control unit is an integrated circuit.

22. The control unit as claimed in claim 20, wherein the control unit is an ASIC or microcontroller.

* * * * *